US010125039B2

(12) United States Patent
Al-Anzi

(10) Patent No.: US 10,125,039 B2
(45) Date of Patent: Nov. 13, 2018

(54) METHOD OF RECYCLING BRINE FROM A MULTI-STAGE FLASH DESALINATION PLANT

(71) Applicant: KUWAIT UNIVERSITY, Safat (KW)

(72) Inventor: Bader Shafaqa Al-Anzi, Abdullah Almubarak (KW)

(73) Assignee: Kuwait University, Safat (KW)

( * ) Notice: Subject to any disclaimer, the term of this patent is extended or adjusted under 35 U.S.C. 154(b) by 254 days.

(21) Appl. No.: 15/333,150

(22) Filed: Oct. 24, 2016

(65) Prior Publication Data

US 2018/0111864 A1    Apr. 26, 2018

(51) Int. Cl.
| C02F 9/00 | (2006.01) |
| B01D 61/00 | (2006.01) |
| C02F 1/44 | (2006.01) |
| B01D 3/06 | (2006.01) |
| C02F 103/34 | (2006.01) |

(52) U.S. Cl.
CPC ............... *C02F 9/00* (2013.01); *B01D 3/065* (2013.01); *B01D 61/002* (2013.01); *C02F 1/445* (2013.01); *C02F 2103/34* (2013.01); *C02F 2301/08* (2013.01)

(58) Field of Classification Search
None
See application file for complete search history.

(56) References Cited

U.S. PATENT DOCUMENTS

| 4,242,185 A | 12/1980 | McRae |
| 4,470,891 A | 9/1984 | Moore et al. |
| 6,649,027 B1 | 11/2003 | MacKnight et al. |
| 9,309,138 B2 | 4/2016 | Ogiwara et al. |
| 2006/0144789 A1* | 7/2006 | Cath ............... B01D 61/002 210/641 |
| 2012/0080376 A1 | 4/2012 | Komor et al. |
| 2012/0234664 A1* | 9/2012 | Nicoll ............... C02F 1/041 203/7 |
| 2013/0134094 A1 | 5/2013 | Drew et al. |
| 2013/0206689 A1 | 8/2013 | Gibson Juby et al. |
| 2017/0121189 A1* | 5/2017 | Rahman ............... C02F 1/441 |

FOREIGN PATENT DOCUMENTS

| CN | 102701326 A | 10/2012 |
| CN | 103319042 A | 9/2013 |

* cited by examiner

Primary Examiner — Chester T Barry
(74) Attorney, Agent, or Firm — Richard C. Litman

(57) ABSTRACT

The method of recycling brine from a multi-stage flash desalination plant recycles the high-salinity, high-temperature brine output from a multi-stage flash desalination plant to produce diluted brine suitable for reinjection back into the multi-stage flash desalination plant as a makeup stream. The high-salinity, high-temperature brine output from the multi-stage flash desalination plant is diluted with water extracted from treated wastewater effluent output from a wastewater treatment plant, thus providing further recycling of the treated wastewater effluent. Following osmotic transfer of the diluting water from the treated wastewater effluent to produce the diluted brine, the remaining concentrated treated wastewater effluent passes through a secondary filtration system to yield a solid product and a volume of permeate water. The volume of permeate water may be further mixed with the diluted brine.

13 Claims, 1 Drawing Sheet

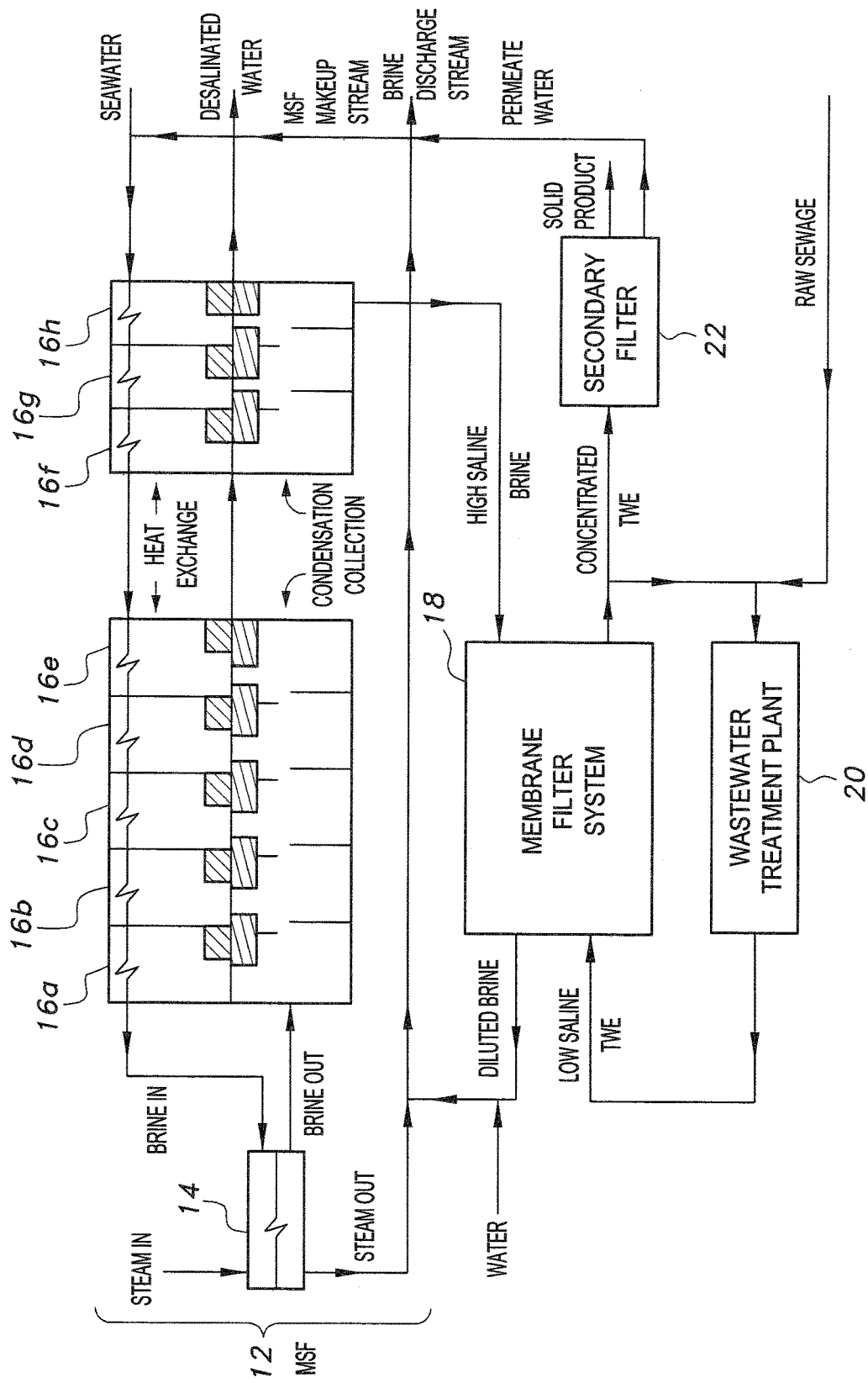

METHOD OF RECYCLING BRINE FROM A MULTI-STAGE FLASH DESALINATION PLANT

BACKGROUND OF THE INVENTION

1. Field of the Invention

The present invention relates to the recycling of waste products from desalination and wastewater treatment plants, and particularly to a method of recycling brine from a multi-stage flash desalination plant.

2. Description of the Related Art

Multi-stage flash (MSF) desalination is a water desalination process that distills seawater by flashing a portion of the water into steam in multiple stages of what are, essentially, countercurrent heat exchangers. At present, multi-stage flash desalination plants produce about 60% of all desalinated water in the world. A typical MSF plant has a series of spaces, called stages, each containing a heat exchanger and a condensate collector. The sequence has a cold end and a hot end, while intermediate stages have intermediate temperatures. The stages have different pressures corresponding to the boiling points of water at the stage temperatures, and after the hot end there is a container, typically referred to as the brine heater.

When the plant is operating in steady state, feed water at the cold inlet temperature flows, or is pumped, through the heat exchangers in the stages and warms up. When it reaches the brine heater it already has nearly the maximum temperature. In the heater, an amount of additional heat is added. After the heater, the water flows through valves back into the stages that have ever lower pressure and temperature. As it flows back through the stages the water is now referred to as brine, to distinguish it from the inlet water. In each stage, as the brine enters, its temperature is above the boiling point at the pressure of the stage, and a small fraction of the brine water boils (i.e., flashes) to steam, thereby reducing the temperature until an equilibrium is reached. The resulting steam is a little hotter than the feed water in the heat exchanger. The steam cools and condenses against the heat exchanger tubes, thereby heating the feed water as described earlier.

The feed water carries away the latent heat of the condensed steam, maintaining the low temperature of the stage. The pressure in the chamber remains constant as equal amounts of steam is formed when new warm brine enters the stage and steam is removed as it condenses on the tubes of the heat exchanger. The equilibrium is stable, because if at some point more vapor forms, the pressure increases and that reduces evaporation and increases condensation. In the final stage, the brine and the condensate has a temperature near the inlet temperature. Then the brine and condensate are pumped out from the low pressure in the stage to the ambient pressure. The brine and condensate still carry a small amount of heat that is lost from the system when they are discharged. The heat that was added in the heater makes up for this loss.

The heat added in the brine heater usually comes in the form of hot steam from an industrial process co-located with the desalination plant. The steam is allowed to condense against tubes carrying the brine (similar to the stages). The energy that makes possible the evaporation is all present in the brine as it leaves the heater. The reason for letting the evaporation happen in multiple stages rather than a single stage at the lowest pressure and temperature, is that in a single stage, the feed water would only warm to an intermediate temperature between the inlet temperature and the heater, while much of the steam would not condense and the stage would not maintain the lowest pressure and temperature.

The output brine, which is typically seen as a waste product, has a relatively high temperature and an extremely high salinity, thus making any type of recovery or recycling of this brine extremely difficult. Thus, a method of recycling brine from a multi-stage flash desalination plant solving the aforementioned problems is desired.

SUMMARY OF THE INVENTION

A method of recycling brine from a multi-stage flash desalination plant recycles the high-salinity, high-temperature brine output from a multi-stage flash desalination plant to produce diluted brine suitable for reinjection back into the multi-stage flash desalination plant as a makeup stream. The high-salinity, high-temperature brine output from the multi-stage flash desalination plant is diluted with water extracted from treated wastewater effluent output from a wastewater treatment plant, thus providing further recycling of the treated wastewater effluent. Following osmotic transfer of the diluting water from the treated wastewater effluent to produce the diluted brine, the remaining concentrated treated wastewater effluent passes through a secondary filtration system to yield a solid product and a volume of permeate water, and the volume of permeate water may be further mixed, for additional dilution, of a brine discharge stream.

The high-salinity, high-temperature brine output from the multi-stage flash desalination plant is initially injected into a membrane filter system. At the same time, treated wastewater effluent (TWE) output from a wastewater treatment plant is also injected into the membrane filter system on the other side of the membrane filter thereof. The high-salinity, high-temperature brine is cooled and diluted in the membrane filter system through osmotic transfer of water from the treated wastewater effluent. Both diluted brine and concentrated TWE are then output from the membrane filter system.

The diluted brine is then mixed with condensed steam output from the multi-stage flash desalination plant, as well as water from an external source, to produce twice-diluted brine.

Simultaneously, a portion of the concentrated treated wastewater effluent is recycled by mixing the concentrated TWE with raw sewage entering the wastewater treatment plant. A remainder of the concentrated TWE is injected into a secondary filter system to produce a solid product and a volume of permeate water. The volume of permeate water is then mixed with the twice-diluted brine to produce thrice-diluted brine. A portion of the thrice-diluted brine is used as a makeup stream for the multi-stage flash desalination plant by mixing the portion of the thrice-diluted brine with the seawater being input into the multi-stage flash desalination plant. A remainder of the thrice-diluted brine is output as the final brine discharge stream.

These and other features of the present invention will become readily apparent upon further review of the following specification and drawings.

BRIEF DESCRIPTION OF THE DRAWINGS

The sole drawing FIGURE diagrammatically illustrates a method of recycling brine from a multi-stage flash desalination plant according to the present invention.

DETAILED DESCRIPTION OF THE PREFERRED EMBODIMENTS

The sole drawing FIGURE illustrates a method of recycling brine from a conventional multi-stage flash (MSF) desalination plant 12. As described above, a typical MSF desalination plant 12 includes a series of stages 16a, 16b, 16c, 16d, 16e, 16f, 16g, 16h, each containing a heat exchange portion and a condensation collection portion. After the hot end (i.e., after stage 16a), brine heater 14 receives the brine from the heat exchange portion of stage 16a and reinjects it back into the condensation collection portion of stage 16a. The heat added in the brine heater 14 comes in the form of hot steam from an external industrial process co-located with the desalination plant 12. It should be understood that the MSF desalination plant 12 shown in the sole drawing FIGURE is shown for exemplary and illustrative purposes only, and that the present method of recycling brine from a multi-stage flash desalination plant may be used with any suitable type of MSF plant which produces desalinated water from seawater using a conventional MSF process.

As shown in the sole drawing FIGURE, the method includes injecting the high-salinity, high-temperature brine output from the multi-stage flash desalination plant 12 into a membrane filter system 18. At the same time, treated wastewater effluent (TWE) output from a wastewater treatment plant 20 is also injected into the membrane filter system 18 on the other side of the membrane filter. It should be understood that wastewater treatment plant 20 may be any suitable type of plant for treating raw sewage. Further, it should be understood that membrane filter system 18 may be any suitable type of membrane filtration system, such as a reverse osmosis filter system, a pressure retarded osmosis filter system, a forward osmosis filter system, an assisted forward osmosis filter system or the like.

The high-salinity, high-temperature brine is cooled and diluted in the membrane filter system 18 through osmotic transfer of water from the treated wastewater effluent. Both diluted brine and concentrated TWE are then output from the membrane filter system 18. The diluted brine retains all chemicals previously added during the desalination process and is cooler than the concentrated brine. The diluted brine is then mixed with condensed steam output from the brine heater 14 of the multi-stage flash desalination plant 12, as well as water from an external source such as recycled cooling water from a power plant, for example, to produce twice-diluted brine.

Simultaneously, a portion of the concentrated treated wastewater effluent is recycled by mixing the concentrated TWE with the raw sewage entering the wastewater treatment plant 20. A remainder of the concentrated TWE is injected into a secondary filter system 22, which may be any suitable type of filtration system, to produce a solid product and a volume of permeate water. The concentrated TWE is rich in nutrients, thus the solid product, which is typically in crystalized form, may be used as fertilizer or the like. The volume of permeate water is mixed with the twice-diluted brine to produce thrice-diluted brine. At least a portion of the thrice-diluted brine can be used as a makeup stream, as is conventionally known, for the multi-stage flash desalination plant 12 by mixing the portion of the thrice-diluted brine with the seawater being input into the multi-stage flash desalination plant 12, thereby forming a closed loop system. A remainder of the thrice-diluted brine can be output as a final brine discharge stream.

It is to be understood that the present invention is not limited to the embodiments described above, but encompasses any and all embodiments within the scope of the following claims.

I claim:

1. A method of recycling brine from a multi-stage flash desalination plant, comprising the steps of:
    injecting brine output from a multi-stage flash desalination plant into a membrane filter system;
    injecting treated wastewater effluent output from a wastewater treatment plant into the membrane filter system;
    diluting the brine in the membrane filter system through osmotic transfer of water from the treated wastewater effluent to produce diluted brine and concentrated treated wastewater effluent; and
    outputting the diluted brine from the membrane filter system and mixing the diluted brine with condensed steam output from the multi-stage flash desalination plant to produce twice-diluted brine.

2. The method of recycling brine from a multi-stage flash desalination plant as recited in claim 1, wherein the membrane filter system comprises a pressure retarded osmosis filter system.

3. The method of recycling brine from a multi-stage flash desalination plant as recited in claim 1, wherein the membrane filter system comprises a forward osmosis filter system.

4. The method of recycling brine from a multi-stage flash desalination plant as recited in claim 1, wherein the membrane filter system comprises an assisted forward osmosis filter system.

5. The method of recycling brine from a multi-stage flash desalination plant as recited in claim 1, further comprising the step of mixing the diluted brine output from the membrane filter system with water from an external source.

6. The method of recycling brine from a multi-stage flash desalination plant as recited in claim 1, further comprising the step of outputting the concentrated treated wastewater effluent from the membrane filter system.

7. The method of recycling brine from a multi-stage flash desalination plant as recited in claim 6, further comprising the steps of:
    mixing a portion of the concentrated treated wastewater effluent with raw sewage entering the wastewater treatment plant; and
    injecting a remainder of the concentrated treated wastewater effluent into a secondary filter system to produce a solid product and a volume of permeate water.

8. The method of recycling brine from a multi-stage flash desalination plant, as recited in claim 7, further comprising the step of mixing the volume of permeate water with the twice-diluted brine to produce thrice-diluted brine;
    mixing a portion of the thrice-diluted brine with seawater input into the multi-stage flash desalination plant as a makeup stream for the multi-stage flash desalination plant; and
    outputting a remainder of the thrice-diluted brine.

9. A method of recycling brine from a multi-stage flash desalination plant, comprising the steps of:
    injecting brine output from a multi-stage flash desalination plant into a membrane filter system;
    injecting treated wastewater effluent output from a wastewater treatment plant into the membrane filter system;

diluting the brine in the membrane filter system through osmotic transfer of water from the treated wastewater effluent;
outputting diluted brine from the membrane filter system and mixing the diluted brine with condensed steam output from the multi-stage flash desalination plant to produce twice-diluted brine;
outputting concentrated treated wastewater effluent from the membrane filter system;
mixing a portion of the concentrated treated wastewater effluent with raw sewage entering the wastewater treatment plant;
injecting a remainder of the concentrated treated wastewater effluent into a secondary filter system to produce a solid product and a volume of permeate water;
mixing the volume of permeate water with the twice-diluted brine to produce thrice-diluted brine;
mixing a portion of the thrice-diluted brine with seawater input into the multi-stage flash desalination plant as a makeup stream for the multi-stage flash desalination plant; and
outputting a remainder of the thrice-diluted brine as a final brine discharge stream.

10. The method of recycling brine from a multi-stage flash desalination plant as recited in claim 9, wherein the membrane filter system comprises a pressure retarded osmosis filter system.

11. The method of recycling brine from a multi-stage flash desalination plant as recited in claim 9, wherein the membrane filter system comprises a forward osmosis filter system.

12. The method of recycling brine from a multi-stage flash desalination plant as recited in claim 9, wherein the membrane filter system comprises an assisted forward osmosis filter system.

13. The method of recycling brine from a multi-stage flash desalination plant as recited in claim 9, further comprising the step of mixing the diluted brine output from the membrane filter system with water from an external source.

* * * * *